Patented Mar. 7, 1939

2,149,993

UNITED STATES PATENT OFFICE 2,149,993

COMPOSITION CONTAINING A RHODAMINE DERIVATIVE

Gorton R. Fonda, Schenectady, N. Y., assignor to General Electric Company, a corporation of New York No Drawing. Original application October 8, 1936, Serial No. 104,663. Divided and this application March 30, 1937, Serial No. 133,851

5 Claims. (Cl. 260—41)

The present invention relates broadly to a composition containing a new rhodamine derivative, specifically a rhodamine B compound in which an alkali metal is substituted for hydrogen of the carboxyl group. The compositions of this invention are especially adapted for use in the production of light-transforming surfaces. The present application is a division of my co-pending application Serial No. 104,663, filed October 8, 1936 which latter is a continuation-in-part of a co-pending application Serial No. 60,276, filed January 22, 1936. In the parent application Serial No. 104,663, claims are made, including both method and article features, to light-transforming screens or reflectors which may be produced with the compositions claimed in this application.

In my co-pending application Serial No. 60,276 I have disclosed and claimed a fluorescent screen or reflector of the type used for correcting the spectre of light sources which are deficient in one or more spectral colors and the combination of such screens and light sources. In accordance with that invention a fluorescent screen having a much longer life than attainable with similar screens theretofore known and which is also highly efficient in converting impinging radiant energy into fluorescent light of a complementary color is provided by employing a fluorescent coating having a thickness in excess of that required to transform completely the impinging radiations, but disposed in such a discontinuous fashion that the final blending of transformed and untransformed light will afford a substantially proper spectral distribution. In my co-pending application Serial No. 60,276, I disclosed but did not claim a derivative of rhodamine B formed by substituting the alkali metal potassium for hydrogen of the carboxyl group of rhodamine B, and the use of this compound in solution form as a fluorescent coating material for application to a surface to form a light-transforming screen or reflector. In the following specification I shall describe with greater particularity alkali metal derivatives of rhodamine B, and how they may be made and used.

The present invention is based upon the observation, not heretofore known and which was not obvious from the literature describing the properties of rhodamine B, that a rhodamine dye in which an alkali metal has been substituted for hydrogen of the carboxyl group of rhodamine B yields a fluorescence which is more permanent under exposure to light than rhodamine B.

It has heretofore been known, that rhodamine and derivatives thereof may be incorporated in compositions that may be used for transforming light rays and, also, for adding light waves of definite character to light from any source. Such compositions are disclosed in the British Patent 16,271 of 1911 to Peter Cooper Hewitt, and in U. S. Patents 1,150,118, 1,888,655 and 1,188,777, also to Hewitt. I make no broad claim to the use of rhodamine or any derivative thereof in combination with other ingredients for such uses as mentioned above, but I do claim as new and novel an alkali metal salt of rhodamine B and its use in particular compositions for making light-transforming screens or reflectors having such improved permanence under exposure to light as to provide a screen that is, in its practical effect, different in kind from light-transforming screens heretofore known to the art.

In the literature on the fluorescence of rhodamine, the form thereof commonly referred to is Schultz No. 573, which is a chloride of a rhodamine B base. It has the empirical formula $C_{28}H_{31}N_2O_3Cl$ and the constitutional formula

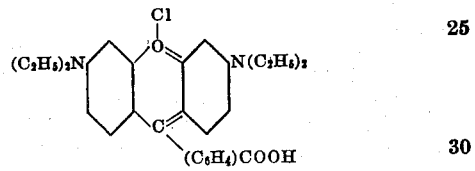

The term "rhodamine B" as used, generally, herein refers to the form of rhodamine B in common use as a dye, that is in the chloride form. Such form of rhodamine B also is known as rhodamine B hydrochloride. The rhodamine alkali metal salt derivative embodying my invention has the empirical formula $C_{28}H_{30}N_2O_3ClR$ and the constitutional formula

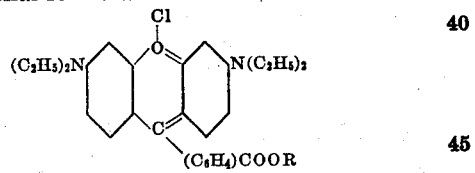

where R stands for an alkali metal.

In order that my invention may be more clearly understood and practiced by those skilled in the art to which this invention relates, the following specific examples are given as illustrative of methods by which alkali metal salts of rhodamine B may be prepared. The processes will be described with particular reference to potassium, but they are obviously applicable to the preparation of the rhodamine B salts of the other alkali metals, viz. lithium, sodium rubidium and caesium.

Five grams of rhodamine B are dissolved in a solvent or mixture of solvents in which the potassium salt of rhodamine B is substantially more insoluble than rhodamine B. Examples of suitable solvents are acetone, ethyl alcohol, or mixtures thereof, or mixtures of either or both with water. Advantageously a 50:50 mixture of water and ethyl alcohol of about 95 per cent strength is employed. To such a solution is added a solution of a similar alcohol-water solvent containing an equi-molecular amount, and advantageously slightly more than the equi-molecular amount of potassium hydroxide required to form the potassium salt of rhodamine B, for example, 0.67 gram of potassium hydroxide. This mixed solution is evaporated until crystals appear. The crystals are separated from the mother liquor by suitable means, for instance, by vacuum filtration. The separated crystals are dissolved in a fresh mixture of alcohol and water and evaporated again until crystals appear. The purified crystals are separated from the solution by vacuum filtration or other convenient means and then are dried, for example, over phosphorous pentoxide.

Compositions for coating screens or other backing or supporting members may be made as hereinafter described, with solid alkali metal salt of rhodamine B prepared in the manner described and, for purpose of illustration, the potassium salt of rhodamine B is specified. A suitable amount, for instance, 2.07 grams of the potassium salt of rhodamine B, is dissolved in one liter of an appropriate solvent such as ethyl alcohol. For use in a coating composition, the alcohol solution of the potassium salt of rhodamine B is diluted to a ten-fold volume by adding a solution of cellulose acetate, advantageously a solution of cellulose acetate in acetone and containing, for example, about 30 per cent cellulose acetate. Such a mixture has a concentration of the potassium salt of rhodamine B of $4(10)^{-4}$ molar, that is, one liter of solution contains a weight of the potassium salt which is 0.0004 times its molecular weight. This mixture when applied to a reflecting surface and dried shows, under exposure to light, a rate of fading that is surprisingly less than that shown by rhodamine B. Thus, a thin film composed of rhodamine B and a binder of cellulose acetate, when exposed to a quartz mercury-vapor lamp at a distance of 2½ inches (4000 foot candles) showed a loss of about 75 per cent of its original fluorescence after 200 hours exposure and almost a complete loss of fluorescence after 400 hours exposure. A similar film composed of the potassium salt of rhodamine B and cellulose acetate, when exposed in a like manner, showed a loss of only 10 per cent of its original fluorescence after 1500 hours exposure.

Another example of a method of preparing an alkali metal salt of rhodamine B and a fluorescent coating composition containing such a salt, and again for illustrative purposes the potassium salt is mentioned, is as follows:

Equi-molecular solutions of rhodamine B and potassium hydroxide are prepared by separately dissolving 1.915 grams of rhodamine B per liter of a suitable solvent such as acetone or ethyl alcohol and 0.220 gram of potassium hydroxide per liter of the same solvent as used with the rhodamine B. These solutions are mixed and then diluted to a 5-fold volume by adding thereto a solution of cellulose acetate in a solvent which is miscible with the solvent used in making the mixed solution of rhodamine B and potassium hydroxide, advantageously a solution of cellulose acetate in acetone and containing, for example, about 30 per cent cellulose acetate. As in the previous illustration, one liter of the composition prepared as described contains a weight of the potassium salt of rhodamine B which is 0.0004 times its molecular weight.

For convenience in applying to light-reflecting surfaces a fluorescent coating composition made in such ways as hereinbefore set forth, that is to say, in order to improve its brushing properties, various high-boiling diluents of the kind used in ordinary varnishes may be added thereto. Examples of such diluents are ethyl lactate, monomethyl ether of ethylene glycol and the acetate of the mono-ethyl ether of diethylene glycol ("Carbitol" acetate). Advantageously, I have added 10 per cent by volume of ethyl lactate to fluorescent coating compositions of the kinds above mentioned, to obtain a composition of improved brushing properties. Larger or smaller amounts of such diluents may be employed in order to improve the spreading and brushing properties of the composition. The composition may be applied to a surface without further dilution or, in certain cases, for example, when it is desired to form a very thin fluorescent film, the coating composition may be further thinned with a suitable solvent such as acetone or alcohol.

The intensity of fluorescence of a rhodamine dye is dependent not only upon the particular rhodamine dye but also upon the particular solid solvent or binder used in its application. I have found that greatest efficiency and life of a fluorescent film comprising the hereinbefore mentioned class of organic compounds is realized when such solid solvents or binders as cellulose acetate or "Formvar" are used. "Formvar" is the trade name of a class of compounds produced, generally speaking, by reacting a partially or completely hydrolyzed polymerized vinyl ester with an aldehyde. The preparation of such compounds is set forth, for example, in U. S. Patent No. 2,036,092, to Morrison et al. Binders other than cellulose acetate and "Formvar" may be used, and may be of either organic or inorganic composition. Any suitable liquid solvent may be employed in applying the alkali metal salt of rhodamine B and binder therefor to the reflecting surface to be coated. Supporting members for the composition may comprise, for example, such substances as metals, for instance, aluminum, nickel, chromium, steel, etc., the surfaces of which are opaque and such as to produce diffused reflection; and such other materials, having the same opaque and diffusing characteristics described with reference to metals, as special glasses, porcelain, enameled surfaces, paper, cardboard, or silk, rayon, linen, cotton, or other textile fabric.

In preparing and using a coating composition containing an alkali metal salt of rhodamine B, it is important, in order to obtain maximum resistance of a film thereof to fading when exposed to light, that there be a definite relationship between said salt and binder as they are present in the dried film. This relationship can be most easily expressed by specifying the concentration of the alkali metal salt of rhodamine B in the liquid solution containing the preferred binder. Although I have found, taking the potassium salt of rhodamine B as a specific example, that best results are obtained when said salt is applied to a supporting member in the form of a solution containing, as a maximum, about 0.2 gram thereof per liter of solution, such preferred concentration is not essential in effectively utilizing the rhodamine salt of this invention for fluorescent purposes. The concentration of the salt may be substantially diminished, for example, to as low as about 0.02 gram of the salt per liter of solution, and for the same concentration of cellulose acetate solution (or solution of other binder), without marked effect upon the intensity of fluorescence and life of the dried film. In other words, for the same concentration of binder, advantageously I may use, in making a light-transforming screen or reflector, a solution containing a weight of alkali metal salt of rhodamine B per liter of solution that is about 0.00004 to 0.0004 times its molecular weight. As pointed out in my co-pending application, Serial No. 60,276, filed January 22, 1936, a considerable increase in the efficiency of a fluorescent film is obtained if stripes of the film are applied with an optimum thickness, which, for a concentration such as indicated above as preferable, should be between about 2 and 14 mils.

Alkali metal salts of rhodamine B produced in accordance with this invention may be applied to a supporting or a backing member to form either a continuous or a discontinuous surface. They may be applied so as to form vertical, horizontal or other stripes, or the surface may be completely coated with the composition. They may be applied to a screen or reflector used in connection with a metal-vapor lamp, for instance, a mercury-vapor lamp, and in such use improve the quality of the illumination provided by such sources by producing the complementary color red, of which the light given off by the ordinary mercury-vapor lamp is almost entirely devoid. Alkali metal salts of rhodamine B, together with a suitable binder, may be applied to a light-transforming screen adapted both to transmit and to reflect light in the manner described with greater particularity in my co-pending application Serial No. 60,276, filed January 22, 1936, and hereinbefore mentioned. They may also be used in making a light-transforming screen comprising a support and a composite coating thereon obtained by alternately applying to said support, first a solution containing the alkali metal salt of rhodamine B, a binder therefor, such as cellulose acetate or "Formvar", and a liquid solvent; and then a solution of the binder and liquid solvent therefor. Although the coating compositions may be applied in either order, preferably the solution containing the rhodamine salt and binder is applied first and the solution of the binder is applied as the final coating.

The respective coatings are dried after each application by any suitable means, for example, under artificial heat or by exposure to the air. This method of making a light-transforming screen and the advantages of this procedure, viz., a longer screen life, are set forth in more detail in my co-pending application Serial No. 60,276 previously mentioned.

As an alternative procedure to that hereinbefore described for making a light-transforming screen and wherein a permanent supporting or backing member is employed, the coating composition comprising the alkali metal salt of rhodamine B and a binder therefor may be applied to a suitable temporary support, dried, and then stripped from the temporary support and used independently of any other support as a light-transforming or fluorescent screen.

What I claim as new and desire to secure by Letters Patent of the United States is:

1. A composition for making a light-transforming surface comprising alkali metal salt of rhodamine B hydrochloride and a binder therefor.

2. A composition for making a light-transforming surface comprising alkali metal salt of rhodamine B hydrochloride and a product of reacting hydrolyzed polymerized vinyl ester with an aldehyde.

3. A composition for making a light-transforming surface comprising the potassium salt of rhodamine B hydrochloride and cellulose acetate.

4. A liquid coating composition comprising alkali metal salt of rhodamine B hydrochloride, a binder therefor, and liquid solvent for said salt and binder.

5. A liquid coating composition comprising the potassium salt of rhodamine B hydrochloride, cellulose acetate, and acetone.

GORTON R. FONDA.